United States Patent

[11] 3,633,282

| [72] | Inventors | Robert R. Candor<br>5940 Munger Rd., Dayton, Ohio 45459;<br>James T. Candor, 5440 Cynthia Lane,<br>Dayton, Ohio 45429 |
|---|---|---|
| [21] | Appl. No. | 807,539 |
| [22] | Filed | Mar. 17, 1969 |
| [45] | Patented | Jan. 11, 1972<br>Continuation-in-part of application Ser. No. 769,155, Oct. 21, 1968, which is a continuation-in-part of application Ser. No. 748,298, July 29, 1968, now Patent No. 3,491,456, which is a continuation-in-part of application Ser. No. 696,639, Jan. 9, 1968, now abandoned, which is a continuation-in-part of application Ser. No. 639,354, May 18, 1967, now Patent No. 3,405,452, which is a continuation-in-part of application Ser. No. 532,266, Mar. 7, 1968, now Patent No. 3,330,136, which is a continuation-in-part of application Ser. No. 219,587, Aug. 27, 1962, now Patent No. 3,238,750. This application Mar. 17, 1969, Ser. No. 807,539 |

[54] LIQUID-REMOVING APPARATUS AND METHOD
26 Claims, 23 Drawing Figs.

| [52] | U.S. Cl. | 34/1 |
|---|---|---|
| [51] | Int. Cl. | B01k 5/00 |
| [50] | Field of Search | 34/1 |

[56] References Cited
UNITED STATES PATENTS

| 3,057,075 | 10/1962 | Lippke | 34/1 |
|---|---|---|---|
| 3,401,463 | 9/1968 | Doane, Jr. | 34/1 |

*Primary Examiner*—Charles Sukalo
*Attorney*—Candor, Candor & Tassone

ABSTRACT: This disclosure relates to apparatus and methods for making paper sheet material and the like sheet material, wherein a paper sheet or the like producing moisture bearing slurry supply means feeds its slurry to a portion of a belt means to produce a moisture bearing paper web material on such portion of the belt means. Said web material is fed from said belt portion to a web drying section wherein the web has its moisture gradually removed by other portions of the belt means in cooperation with electrostatic electrode means. The electrode means may include relatively large and relatively small electrode means to produce moisture removing nonuniform electrostatic fields. Various parts of previous paper making apparatus may be modified to remove the moisture.

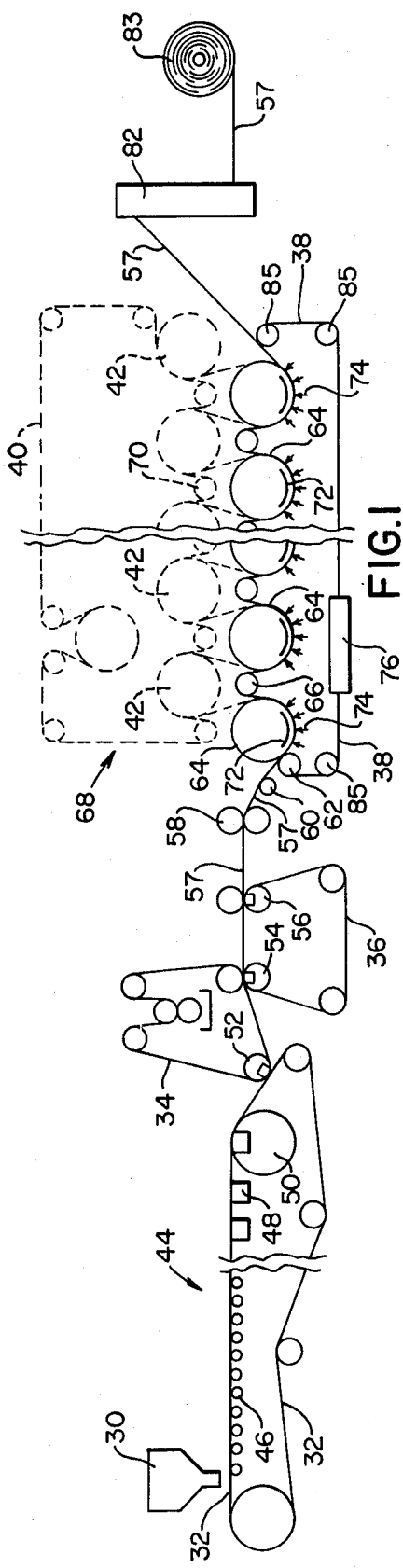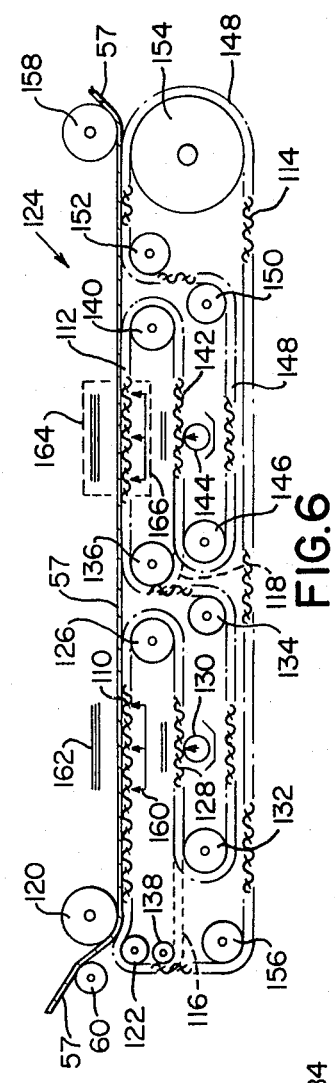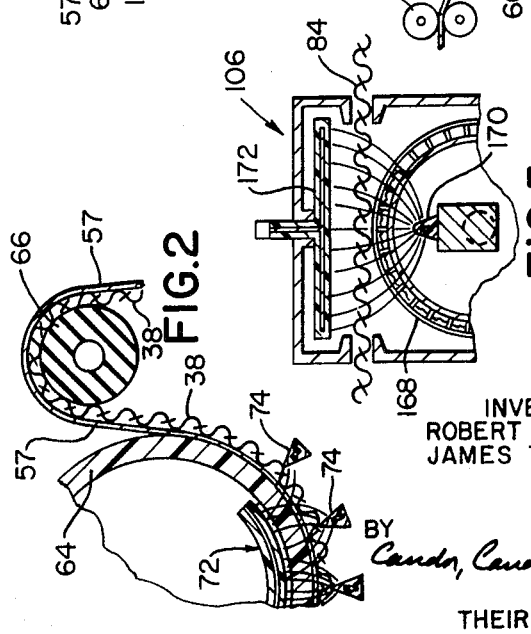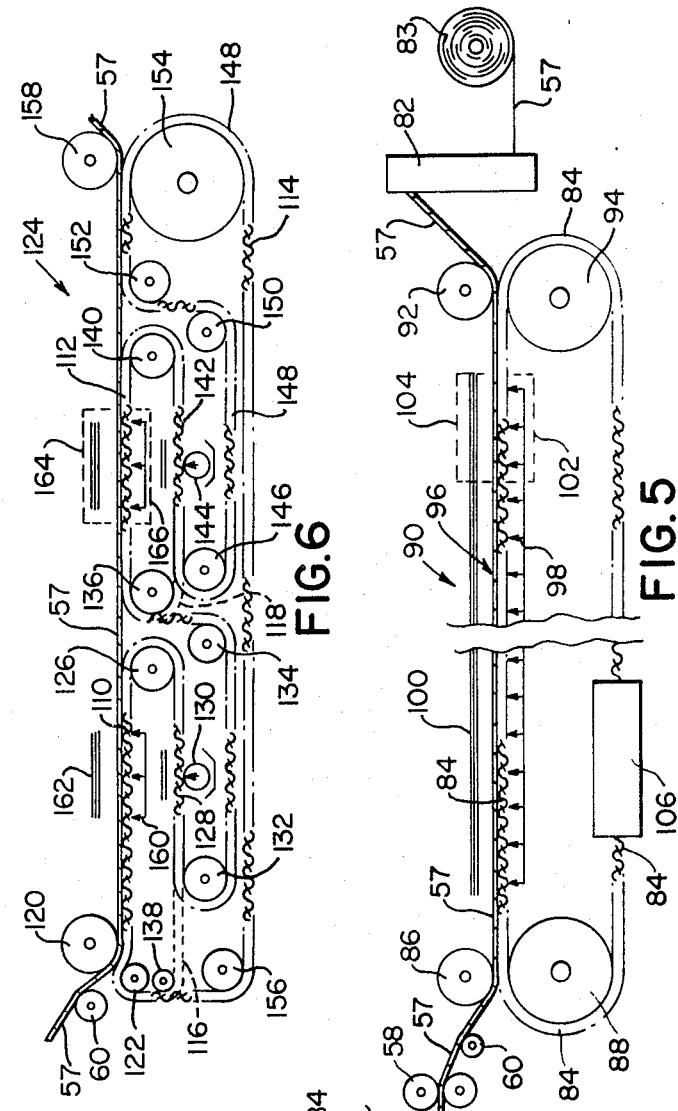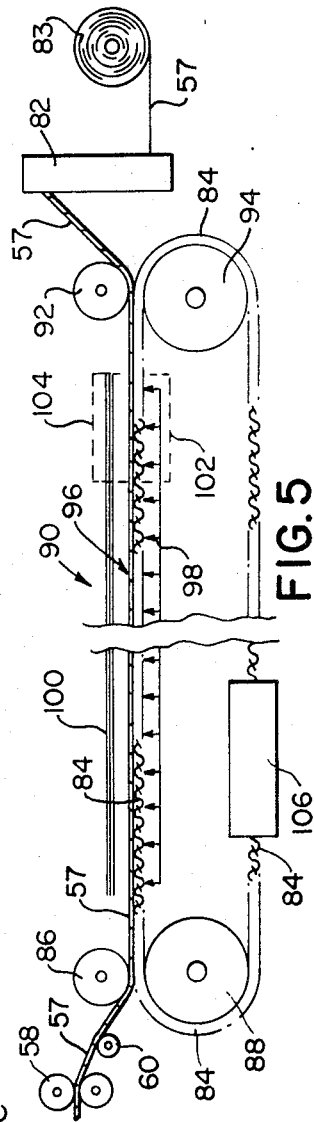

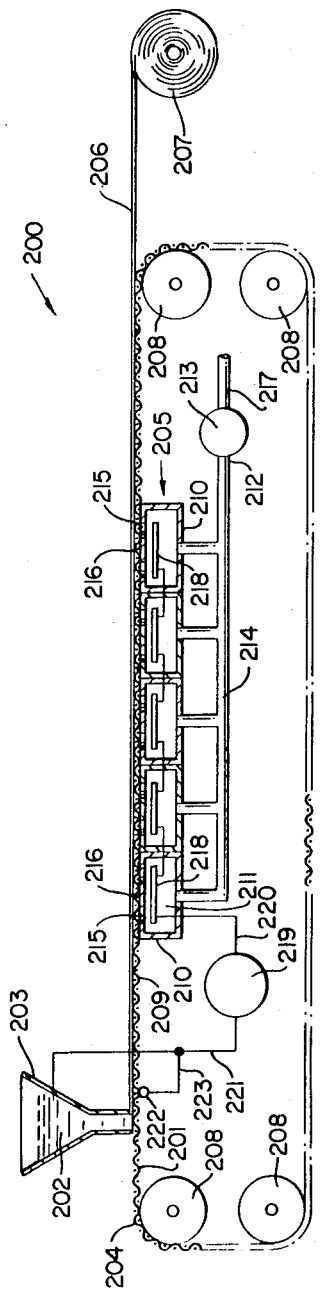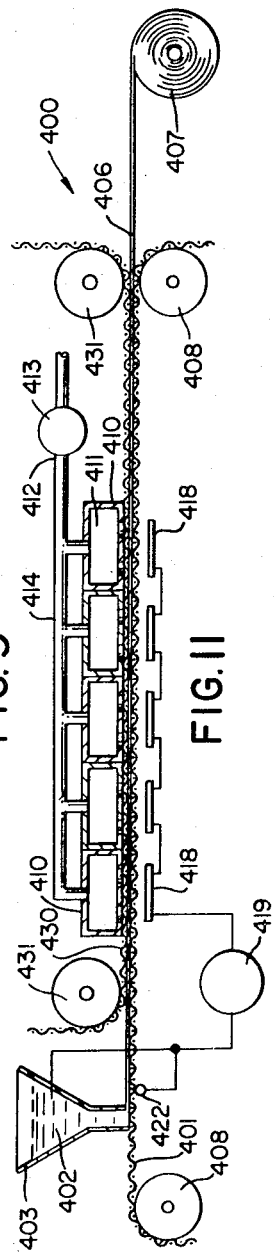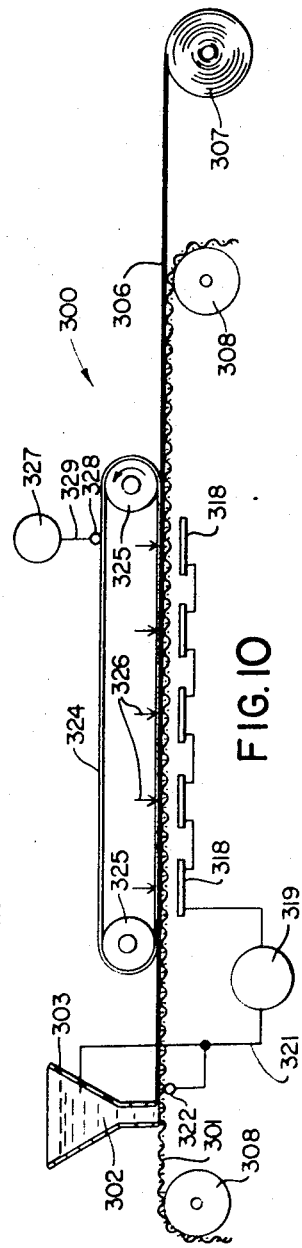

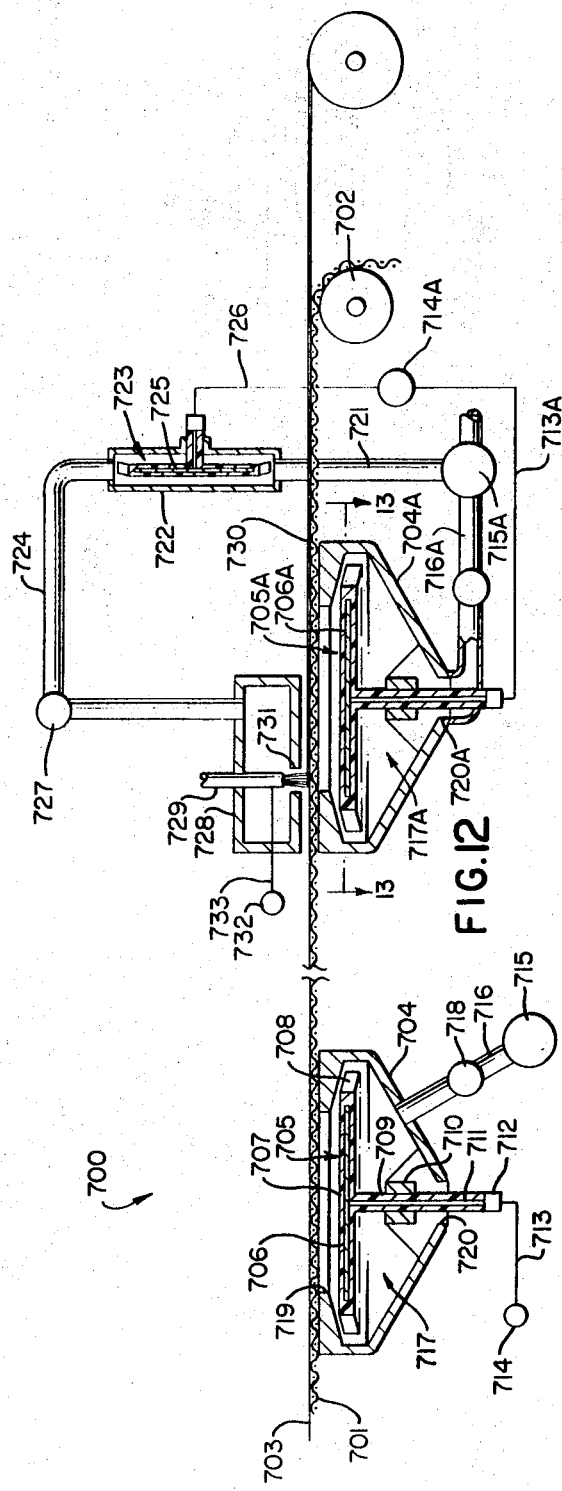

INVENTORS
ROBERT R. CANDOR
JAMES T. CANDOR

BY Candor, Candor & Tassone

THEIR ATTORNEYS

INVENTORS
ROBERT R. CANDOR
JAMES T. CANDOR

BY *Candor, Candor & Tassone*

THEIR ATTORNEYS

LIQUID-REMOVING APPARATUS AND METHOD

This application is a continuation-in-part of its copending Pat. application, Ser. No. 769,155, filed Oct. 21, 1968, which, in turn, is a continuation-in-part of its copending Pat. application, Ser. No. 748,298, filed July 29, 1968, now Pat. No. 3,491,456, which, in turn, is a continuation-in-part of its copending Pat. application, Ser. No. 696,639, filed Jan. 9, 1968, now abandoned, which, in turn, is a continuation-in-part of its copending Pat. application, Ser. No. 639,354, filed May 18, 1967, now U.S. Pat. No. 3,405,452, which, in turn, is a continuation-in-part of its copending Pat. application, Ser. No. 532,266, filed Mar. 7, 1968, now U.S. Pat. No. 3,330,136, which, in turn, is a continuation-in-part of its copending Pat. application, Ser. No. 219,587, filed Aug. 27, 1962, now U.S. Pat. No. 3,238,750.

This invention relates to an improved papermaking apparatus and the like and to an improved method for treating paper and the like.

One of the features of this continuation-in-part application is to illustrate, describe and claim how certain of the previously described features of the electrostatic means, with or without the previously described suction means, can be utilized in improving the making of paper or the like.

Accordingly, it is an object of this invention to provide an improved moisture-removing apparatus having one or more of the novel features set forth above as hereinafter shown or described.

Another object of this invention is to provide an improved method for removing moisture and the like having one or more of the novel features set forth above or hereinafter shown or described.

Other objects, uses and advantages of this invention are apparent upon a reading of this description which proceeds with reference to the accompanying drawings forming a part thereof and wherein:

FIG. 1 is a diagrammatic flow sheet showing one embodiment of apparatus and method for producing paper sheet material, or like sheet material, from paper sheet or like sheet-producing moisture-bearing slurry and including the removal of such moisture by electrostatic electrode means.

FIG. 2 is a diagrammatic, enlarged portion of FIG. 1.

FIG. 3 is a diagrammatic view showing of an electrostatic moisture-removing means which may be used to remove moisture from one of the portions of the belt means disclosed in FIG. 1.

FIG. 5 shows diagrammatically another embodiment of the web-drying section of FIG. 1.

FIG. 6 shows diagrammatically another embodiment of the web-drying section of FIG. 1.

FIG. 9 is a schematic view illustrating another embodiment of a papermaking apparatus and method of this invention.

FIG. 10 is a view similar to FIG. 9 and illustrates another embodiment of this invention.

FIG. 11 is a view similar to FIG. 9 and illustrates still another embodiment of this invention.

FIG. 12 is a view similar to FIG. 9 and illustrates another papermaking apparatus and method of this invention.

FIG. 13 is a fragmentary view taken substantially on line 13—13 of FIG. 12.

FIG. 14 is a fragmentary view similar to FIG. 12 illustrating another papermaking apparatus of this invention.

FIG. 14A is a view similar to FIG. 14 and illustrates another papermaking apparatus of this invention.

FIG. 15 is a cross-sectional view taken on line 15—15 of FIG. 14.

Figure 4:
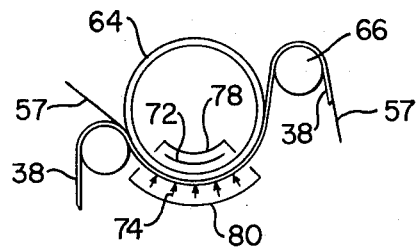
FIG. 4 is a diagrammatic view showing the application of nozzle means to one of the cylinders of FIG. 1.

This invention relates to the manufacture of substantially dry sheet material, such as substantially dry paper sheet material, from a sheet-producing, moisture-bearing slurry material. This is accomplished by the formation of a moisture-bearing web material from such slurry, and the removal of a sufficient amount of moisture from said web material with the aid of belt means and electrostatic means to produce said substantially dry sheet material, such as substantially dry paper sheet material.

By way of example, apparatus and methods are disclosed specifically disclosing the production of substantially dry paper sheet material from such moisture-bearing slurry, it being understood that such disclosure is applicable for the production of other sheet material than paper sheet material.

FIG. 1 discloses apparatus and method including a paper slurry supply means 30. Also moving belt means are disclosed, such as the well-known Fourdrinier screen wire belt means 32, the web transfer felt belt means 34, the press felt belt means 36, and the dryer lower felt belt means 38. FIG. 1 also discloses a dryer upper felt belt means 40 which need not be used, but which is commonly used in prior dryers along with the upper drying heating cylinders 42 to hold the paper web against such upper cylinders.

FIG. 1 discloses a typical Fourdrinier web forming machine 44 which forms a paper web material on the screen wire belt 32. The machine 44 forms the web from the slurry applied on the screen wire belt by supply means 30 so that the web generally has approximately 5 parts of water to 1 part of fiber when the web reaches the right end of the Fourdrinier apparatus. A substantial amount of water has been previously removed from the web as it is formed on the wire screen belt 32 by the action of the table rolls 46, the suction boxes 48, and the suction couch roll 50.

By the time that the moisture-bearing web passes the couch roll 50, such web has a consistency such that it can be lifted off the screen belt 32 by the transfer felt belt 34 in combination with the vacuum pickup roll 52. The web then adheres to the belt 34 until it reaches the press felt belt 38 and the press vacuum roll 54.

The web and belt 36 then travel over another press suction roll 56 where the web 57 is separated from the belt 36. The web 57 then travels through the smoothing press rolls 58, past a guide roll 60 and joins the dryer lower felt belt 38 as the web and belt pass the joining roll 62. The web 57 and belt 38 are held against the modified, first, lower drying cylinder 64 by the insulated plastic reversing roll 66.

Originally the dryer section 68, of the apparatus of FIG. 1, had a lower row of metal dryer lower heating cylinders 64, a lower row of reversing rolls 66, an upper row of metal upper dryer heating cylinders 42 and upper row of reversing rolls 70.

However, in accordance with one embodiment of this invention, the upper heating cylinders 42, the upper reversing rolls 70 and the upper felt belt 40 may be discarded, and only the lower cylinders 42, the lower reversing rolls 66 and the lower felt belt 38 need be used.

Additionally, the original metal cylinders at 64, 64, etc., may be replaced by the plastic or otherwise insulative cylinders 64, as shown in FIG. 2, in which are placed one or more large insulated electrostatic electrodes 72 which have similar functions to those of the large electrodes of FIGS. 16–19. The electrode or electrodes 72 may be stationary in, or may rotate with, the cylinder 64.

Any type of support may be used for the insulation cylinder 64 and the electrode or electrodes 72. For example, the cylinder 64 may be supported at its open ends by outer or inner relatively small gear wheels to maintain the cylinder ends open. The electrode or electrodes 72 may be stationarily supported in the cylinder 64 by insulated conductive supports which may extend into the cylinder 64 at either or both open ends.

One or more relatively small insulated electrodes 74 may be placed adjacent to and slightly spaced from the felt belt 38, web 57 and cylinder 64, as shown in FIGS. 1 and 2. The electrode or electrodes 74 may have similar functions to those of the small electrodes of FIGS. 16–19.

One or more nonuniform electrostatic fields may be produced between the large electrode or electrodes 72 and the small electrode or electrodes 74 in a manner similar to the nonuniform fields to be more fully described in connection with said FIGS. 16–19. This causes moisture to be electrostatically transferred from the moisture-bearing web 57 to the felt belt 38. This moisture may then be later removed from the felt belt 38 by electrostatic action as indicated diagrammatically at 76, FIG. 1, in a manner to be more fully disclosed in connection with FIG. 3.

If desired, the air pressure adjacent the electrode or electrodes 72 and/or 74 may be maintained at a different pressure from the normal environment or local atmospheric pressure. This may be accomplished by providing pressure-varying nozzles 78 and 80 of FIG. 4, which may have similar functions to those more fully to be disclosed in connection with the nozzle means of FIGS. 16–19.

The web 57 and the felt belt 38 may travel together serially past all of the lower drying cylinders 64 and reversing rolls 66, as indicated in FIG. 1, gradually or serially to remove substantially all, or a large proportion of, the moisture from the web 57 and to transfer such proportion of moisture electrostatically to the felt belt 38.

Thereafter the web 57 and the belt 38 may be separated, as diagrammatically indicated in FIG. 1. The substantially dried web 57, if desired, may then be introduced into any suitable heating and/or calendering means 82 where further moisture may be removed from the web 57, and where either or both sides of the web 57 may be calendered by a stack of calendering rolls of well-known construction. Thereafter the web 57 may be wound on reel 83. The felt belt 38 may pass suitable separating guiding and/or tightening rolls 85 and one or more water-removing means 76 which may be either squeeze roll means or electrostatic water removing means of the type more fully to be described in connection with FIG. 3.

Preferably all of the rollers, cylinders, etc., of dryer section 68, are insulated from ground where desirable.

Similar dryer sections to be described in connection with FIGS. 5 and 6, likewise may have their rollers, cylinders, etc., insulated from ground where desirable.

Alternatively, the felt belt 38 of FIGS. 1 and 2 may be temporarily separated from the web 57 at one of the reversing rolls 66, not shown, and may be taken down through a water-removing procedure, substantially as shown and to be described in connection with FIG. 6, and then the dried belt 38 may then be returned and joined with the web 57 at subsequent drying cylinder 64.

FIG. 5 shows a web-drying electrostatic construction which may be substituted for the drying section 68 of FIG. 1.

The moisture-bearing web 57 leaving the smoothing rolls 58 and guide roll 60 of FIG. 1 may alternatively be joined with the dryer lower felt belt 84 of FIG. 5. The web 57 and belt 84 pass between insulative rolls 86 and 88 at one end of the dryer section 90, and past the insulative rolls 92 and 94 at the other end of the section 90.

The web 57 and the upper run of belt 84 may be supported by insulated rolls, or by a stationary insulative, slidable surface support, not shown, to provide a substantially flat run 96 of the web 57 and belt 84.

One or more relatively small insulated electrodes or electrode means 98 are placed below the flat run 96, and one or more relatively large electrodes or electrode means 100 are placed above the flat run 96. The small electrode means 98 and the large electrode means 100 may have substantially the same functions as the small and large electrode means of FIGS. 16–19 which will be more fully described. The construction is such that the electrode means 98 and 100 produce nonuniform fields that cause moisture from the moisture-bearing web 57 to pass into the absorbent felt belt 84, in the same manner as to be more fully described in connection with said FIGS. 16–19. One or more lower and upper nozzles, 102, 104 may be placed below and above the large and small electrodes 98 and 100 to provide air pressure differentials similar to those produced by the nozzles of FIGS. 16–19.

A felt belt drying means 106 may be provided in the lower run of the belt 84. Such drying means may be of any desired character such as heating rolls, squeezing rolls, or electrostatic means. For example, such drying means may be similar to the drying means shown in FIG. 3 which is described in connection with the belt 38 of FIG. 1, but which is equally applicable to belt 84 of FIG. 5. Thereafter the belt 84 returns to roll 84 for a repetition of the web-drying procedure.

After passing the roll 92, the web 57 may pass to the further drying and/or calendering means 82 and reel means 83, as in FIG. 1.

All of the felt or absorbent belts of FIG. 1–6 may be of the character more fully to be described in connection with FIGS. 16–19.

FIG. 6 discloses a web-drying electrostatic construction somewhat similar to the construction of FIG. 5. However, the felt belt means 110, 112, etc., represent any number of a plurality of upper runs of felt belt means that may serially remove moisture from the web means 57, with a separate felt-drying action being provided for each of the separate upper runs 110, 112, etc.

The upper belt runs 110, 112, etc., may be a part of a single felt belt which has a lower run 114. Alternatively the upper belt runs 110, 112, etc., may be parts of separate felt belts 116, 118, etc.

In FIG. 6, the moisture-bearing web 57 may be received from the guide roll 60 of FIG. 1. The web 57 may pass between the feed rolls 120 and 122 of the drying section 124 along with the upper run 110 of the felt belt means. The upper run 110 may be supported on rollers or a stationary, insulative slidable surface support, not shown, and may extend to the belt separating roller 126. There a return or reverse run 128 of the felt belt means passes a belt drying or moisture-removing means 130 which may be of any suitable type, such as heating roll type, a squeeze roll type or an electrostatic moisture remover substantially as disclosed in connection with FIG. 3 which is equally applicable to the return or reverse run 128 as it is to the belt 38 with which it is disclosed.

The reverse run 128 may pass around the roller 132 and be part of the belt means which may continue around the rollers 134 and 136 to become the second upper run 112 of the dryer section 124.

Alternatively, the return run 128 may continue as a separate felt belt means 116 and pass around the rollers 138 and 122 to form the first upper run 110.

The second upper felt belt run 112 may passover the separating roller 140 and become a reverse or return run 142. This run 142 may pass a moisture remover 144 which may be similar to moisture remover 130.

The return run 142 may pass roller 146 and become a part of the single felt belt means 148 which passes rollers 150, 152, 154, 156 and 122 to repeat the web-drying cycle of dryer section 124.

Alternatively, the return run 142 may turn off at 118, pass roller 136 and form the second upper run 112 of a separate felt belt means.

There may be more upper runs than the two illustrated runs 110, 112, and also more than two reverse runs 128, 142, as is obvious.

The web 57 passes over the upper runs 110, 112, etc., and may be separated by a roller 158 and fed to a heat drying and/or calendering means, such as 82 and reel means 83, as elsewhere illustrated.

The upper runs 110, 112, etc., may each be provided with insulated relatively small electrostatic electrodes 160 and relatively large insulated electrodes 162 similar to the electrodes 98 and 100 of FIG. 5 and similar electrodes of FIGS. 16-19. Also upper and lower nozzles 164 and 166 may be provided where desired which may be similar to the nozzles of FIGS. 16-19.

The moisture separator of FIG. 3 may be used to separate moisture electrostatically from any of the felt belts, or other belts, of FIGS. 1, 2, 4, 5, 6, etc.

Figure 20:
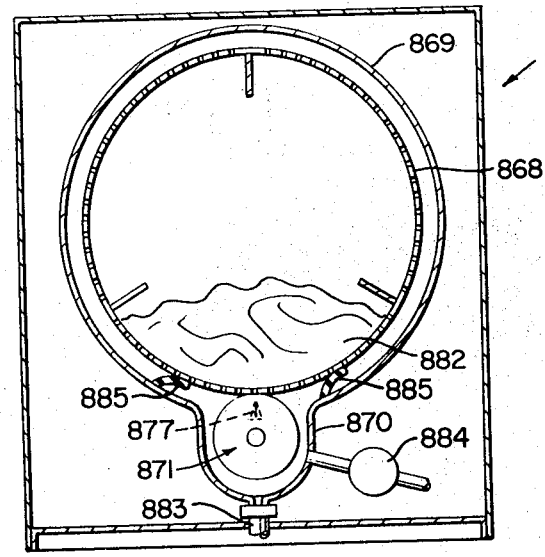
FIG. 20 illustrates another embodiment of electrostatic moisture-removing means which may be modified for use with the various embodiments of this invention.
Figure 21:
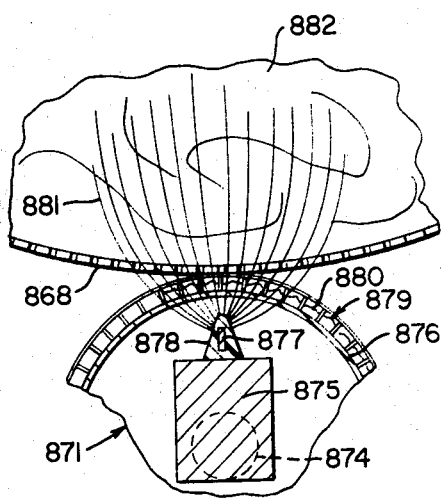
FIG. 21 is an enlarged, fragmentary cross-sectional view of the apparatus of FIG. 20.
Figure 22:
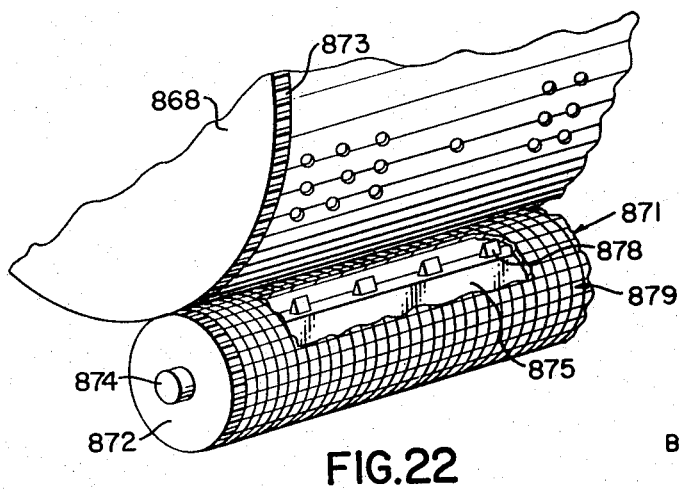
FIG. 22 is a perspective view of the parts of FIG. 21.

For example, the felt belt 38 may pass adjacent a rotatable and cylindrical moisture-collecting means or cylinder 168 which may be similar to the rotary moisture-collecting means illustrated in FIGS. 20-22. FIG. 3 shows the rotary means 168 rotating oppositely from the direction shown in FIG. 21. A relatively small insulated electrode means 170 and a relatively large electrostatic electrode means 172 are placed on opposite sides of the felt belt 138 or other belts herein. As the moisture-bearing belts 38, 84, 148, etc., pass the one or more small electrodes 170, the moisture is caused to enter pockets in the rotor 168. The moisture is then carried to the lower part of the rotor 168, where the pockets are inverted, and the moisture is then emptied into a suitable drain, in the same manner as in FIGS. 20-22.

Figure 7:
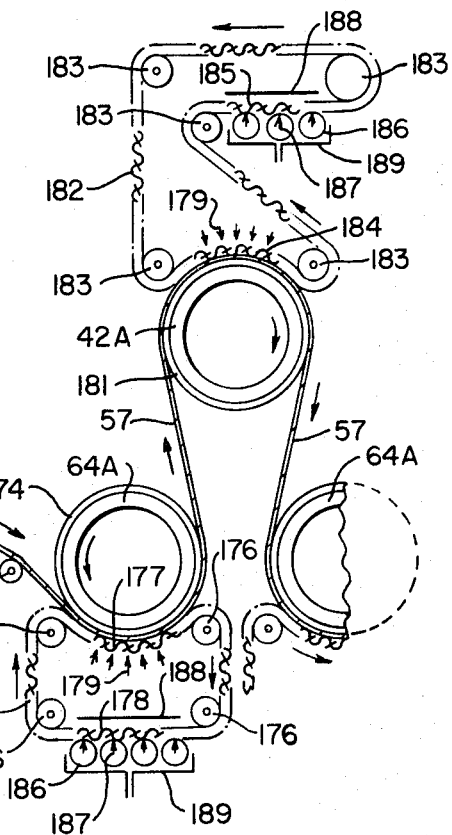
FIG. 7 shows diagrammatically a view of a portion of the drying section of FIG. 1 modified to form another embodiment of this invention.
Figure 8:
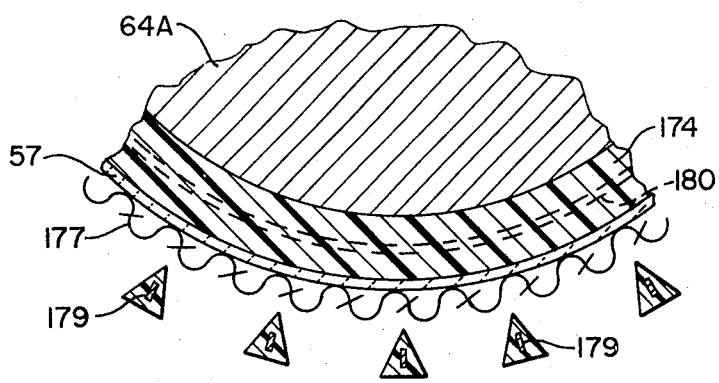
FIG. 8 is an enlarged view of a portion of FIG. 7.

While the embodiments of FIGS. 1-3 have been disclosed as using modified lower insulated drying rolls 64 which have replaced the previous steam-heated metal rolls, it is possible to use the old previous metal steam-heated rolls 64 as disclosed in connection with FIGS. 7 and 8.

Also, if desired, the old metal upper steam-heated rolls 72 need not be discarded, and can be used in combination with the lower rolls, also as disclosed in connection with FIGS. 7 and 8.

For example, in such FIGS. 7 and 8, the previous steam-heated metal cylinders or drums 64A may be retained and may remain grounded. A web spacing, insulating sleeve 174 may be placed around each previous lower metal cylinder 64A.

The moisture-bearing web 57 of FIG. 1 may pass the guide roll 60 and may be fed on the sleeve 174 of the first lower previous metal roll 64A. A lower absorbent felt belt 175 may be guided by one of the guide rolls 176 to hold the web 57 against such sleeve 174, then pass the other guide rolls 174 in a manner to provide an upper moisture-absorbing run 177 and a lower moisture-discharging run 178. A plurality of relatively small insulated electrostatic electrodes 179 may be placed under and adjacent the upper run 177 of the belt 175. The grounded metal drum 64A may form a relatively large electrostatic electrode to produce a strong nonuniform field between said drum 64A and said relatively small insulated electrodes 179 to drive moisture into the upper run 179 of the absorbent felt belt 175 in a manner similar to that to be described in connection with FIGS. 16-19, except that the large electrode formed by old metal cylinder 64A is grounded, and the nonuniform fields of FIGS. 7 and 8 are produced by the potential differential between the ground and the highly charged small electrodes 179.

However, if desired, a large metal electrode sleeve 180 may be embedded in the insulative sleeve 174, and such sleeve 180 may be charged with an opposite highly charged potential from the high charge of the small electrodes 179.

After the partially dried web 57 passes the roll 64A it continues upwardly to pass around the first upper previous metal cylinder 42A.

The metal cylinder 42A may be covered with an insulative sleeve 181, similar in function to sleeve 174. A moisture-absorbing felt belt 182 is guided by guide rolls 183 in a manner to form a moisture-absorbing run 184 and a moisture discarding run 185.

A plurality of relatively small insulated electrodes 186 may be placed adjacent the moisture-absorbing run of belt 182 to form nonuniform fields with the relatively large grounded electrode formed by the grounded metal cylinder 42A in a manner corresponding to the action described for metal drum 64A and electrodes 179. Alternatively, if desired, the insulative sleeve 181 may be provided with an embedded metallic sleeve similar in function and construction to sleeve 180 shown in FIG. 7. This causes moisture to be driven into the absorbing run 184 of the belt 182.

The belt 182 passes the guide rolls to cause the discarding run 185 to have its wetter side downwardly directed so that the freshly absorbed moisture may be driven out of said wet side. Likewise the discarding run 178 of belt 175 has its wetter side downwardly directed for the same reason.

The moisture discarding runs 178 and 185 of belts 175 and 182 may pass the moisture-removing members 186 which may be of any suitable type, such as heating roll type, squeezing roll type, or the electrostatic type shown in FIG. 3. If they are of the electrostatic type they may be provided with insulated relatively small insulated electrostatic electrodes 187 and with one or more relatively large insulated electrostatic electrodes 188 which will cause the moisture to be deposited and removed through drains 189.

The web 57 may continue in a manner to zigzag down and up past the remaining upper and lower drying cylinders 47 and 64 of the drying section in which all of the drying cylinders have been modified as disclosed in connection with FIGS. 7 and 8.

If desired, the previous old metal drums or cylinders 64A and 42A of FIGS. 7 and 8 may be used without the insulating sleeve 174. Such bare drums then can be used as the large electrostatic electrodes at ground potential to form the nonuniform fields with the small electrodes 179. Alternatively the drums 64A and 42A may be insulated from ground and may be highly charged with an opposite potential from that of the small electrodes 179 to form a strong nonuniform field.

The moisture-absorbing belts of FIGS. 1-8 may be similar in construction to those to be disclosed in connection with FIGS. 16-19 so that they may have a moisture-impervious layer opposite the wetted side, if desired, or such impervious layer may be omitted, if desired, all in a manner to be described in connection with said FIGS. 16-19. The wetted side of the moisture-absorbing belts is the side which has been contacting and wetted by the moisture-containing, paper-producing web in such FIGS. 1-8.

In all of the embodiments of FIGS. 1-8, the heating and calendering means 82 may be omitted, and the paper sheet material may be fed from the drying sections 68, 90, and 124 to the reel 83, if desired.

Further embodiments of this invention using electrostatic means for changing bulk moisture-bearing slurry into sheet material, such as paper sheet material are further shown in FIGS. 9-19.

Reference is now made to FIG. 9 wherein an improved papermaking apparatus of this invention is diagrammatically shown and is of the general nature previously disclosed in connection with FIGS. 1-8 which is generally indicated by the reference numeral 200 and comprises a continuously moving foraminous belt means 201 for receiving metered quantities of a paper slurry 202 from a supply means 203 thereof onto the side 204 to be carried in substantially sheet form from left to right and have the liquid therein removed by improved drying means, generally indicated by the reference numeral 205, of this invention so that the dried resulting paper sheet means 206 can be continuously drawn off the right-hand end of the foraminous belt means 201 to form a supply coil 207 thereof in a conventional manner.

While the continuously moving belt means 201 can be arranged in any suitable manner to carry the slurry 202 in sheet form or in individual sheet forms from the supply means 203 to the right, the arrangement illustrated in FIG. 9 comprises a continuous foraminous belt means 201 directed around suitable guide roller means 208 and being continuously driven in a clockwise direction by any suitable driving means (not shown).

The under surface 209 of the foraminous belt means 201 is adapted to passover and in sliding contact with a plurality of conventional suction box means 210 which have the chambers 211 thereof fluidly interconnected to the inlet side 212 of a vacuum pump means 213 by suitable conduit means 214 whereby the suction created in the chambers 211 of the box means 210 acts through the foraminous belt means 209 at opening means 215 in the tops 216 of the box means 210 to tend to draw liquid out of the moving paper slurry sheet means 206 through the foraminous belt means 201 and into the inlet side 212 of the pump means 213 so as to be expelled out the outlet side 217 thereof.

In each suction box means 210 adjacent the top 216 thereof, but in spaced relation therefrom, is disposed an electrode means 218 adapted to have one potential imposed thereon by an electrostatic device 219 interconnected thereto by lead means 220 in substantially the same manner as the electrostatic creating means in said U.S. Pat. No. 3,405,452.

Thus, it can be seen that by creating a potential differential between the liquid in the paper sheet slurry 206 passing over the electrode means 218 and the suction box means 210, such potential differential tends to draw such liquid from the sheet slurry 206 through the foraminous belt means 201 and into the suction box means 210 toward the electrode means 218 whereby such electrostatic principle assists the suction means 213 in removing the moisture from the paper slurry means 206 in a believed to be faster manner than when the electrode means 218 are not utilized.

It is believed that such potential differential liquid removing operation of the electrode means 218 can be further improved by having an opposite potential imposed on the liquid in the moisture-bearing material 206 while the same is being supported on the side 204 of the moving foraminous belt means 201.

For example, the other potential being created by the electrostatic means 219 can be imposed directly in the paper slurry 202 in the supply means 203 by a lead means 221 so that when the paper slurry 206 is deposited on the side 204 of the foraminous belt means 201, the liquid therein has one potential so that when the same moves over the suction box means 210, the opposite potential on the electrode means 218 will more fully attract the liquid in the paper slurry 201 to tend to draw the same through the foraminous belt means 201 into the suction box means 210.

Alternately, or in combination, rotatable electrode means 222 can be interconnected to the lead 221 of the electrostatic device 219 by a lead 223 so that a potential opposite to the potential being imposed on the electrode means 218 by the electrostatic device 219 can be imposed directly on the belt means 201, if the belt means 201 is formed of conductive material, such as being metallic foraminous belt means or the like. In this manner the foraminous belt means 201 will have a potential imposed thereon which is opposite to the potential imposed on the electrode means 218.

If the electrode 222 is utilized in combination with the foraminous belt means 201 and the electrostatic device 219 does not impose a potential in the liquid of the slurry 202 in the supply means 203, it can be seen that the liquid in the slurry 202 in the supply means 203 will be substantially at ground potential and after the same is deposited on the side 204 of the moving belt means 201, the potential imposed on the belt means 201 by the electrode means 222 will tend to cause the liquid in the paper slurry sheet means 206 to be drawn toward the belt means 201 and have the potential of the belt means 201 imposed thereon at a point adjacent the belt means 201 where it contacts the drawn liquid whereby the opposite potential on the electrode means 218 will thereafter attract the liquid adjacent the belt means 201 through the belt means 201 into the suction box means 210.

Accordingly, it can be seen that the papermaking apparatus and method 200 of FIG. 9 provides improved means for drying or removing the liquid in paper slurry being formed into sheet form either as a continuous sheet or individual sheets, as desired.

Further, while the embodiment of FIG. 9 has been specifically described as a papermaking apparatus, it is to be understood that such apparatus could be other apparatus that forms members from liquid-bearing material that is to be subsequently dried by having the liquid removed therefrom.

While the papermaking apparatus and method 200 previously described for the embodiment of FIG. 9 utilizes the electrode means 218 in combination with suction box means 210 in removing the liquid from the paper slurry 206 through the foraminous belt means 201 to the other side 209 thereof, it is to be understood that it may be found that the electrode means 218 can be utilized without such suction means and effectively remove the moisture from the paper slurry 206 in such a manner that no airflow is provided through the paper slurry during the drying operation so that an improved paper is made, such as by not having a need for a subsequent rolling of the same and/or by providing an improved surface or sides thereof that cannot be provided when a suction means is utilized thereon.

For example, reference is now made to FIG. 10 wherein another papermaking apparatus of this invention is generally indicated by the reference numeral 300 and parts thereof similar to the apparatus 200 previously described are indicated by like reference numerals raised in value by 100.

As illustrated in FIG. 10, the apparatus 300 is identical to the apparatus 200 previously described except that the apparatus 300 does not utilize the suction box means 210 and suction means 213 to assist in the removing of the liquid from the slurry 303 being moved by the foraminous belt means 310 from left to right as the liquid in the slurry sheet 306 is being drawn therefrom solely by the potential differential created therebetween by the electrostatic device 319 imposing one potential on the electrode means 318 and imposing an opposite potential either on the liquid in the slurry 302 in the supply means 303 and/or on the foraminous belt means 301 by the electrode means 322 or without imposing any opposite potential on the liquid in the slurry by not having its lead 321 operatively connected to the paper slurry 305.

However, it may be found that it is also desirable to provide a squeezing action on the paper sheet means 306 as it passes from left to right over the electrode means 318 to either improve the surface quality of the resulting sheet means and/or assist in removing the moisture therefrom so that the resulting sheet means 306 will have the desired thickness and also the desired upper finish on the upper side thereof.

If so, a continuous metallic belt means 324 can be passed around roller means 325 so as to be disposed over the sheet means 306 and be engageable therewith while the lower run of the belt means 324 is moving from left to right in unison with the upper run of the belt members 201. By so controlling the position of the electrode means 318 relative to the moving belt means 301 and in connection with the moving belt means 324, an attractive force by the potential differential between the belt means 324 and electrode means 318 will be created to tend to pull the belt means 324 downwardly, as indicated by the arrows 326 in FIG. 10 to compact the sheet means 306 between the lower run of the belt means 324 and the foraminous belt means 301 so as to provide an improved finishing on the upper side of the sheet means 306 and/or to provide a squeezing action on the sheet means 306 to assist in the liquid-removing operation thereof, or both, as well as to insure a predetermined thickness of the resulting sheet means 306 being wound on the coil means 307.

In order to improve the action of the belt means on the sheet means 306 for one or more of the purposes previously described, the electrostatic device 319 or another electrostatic device 327 can impose a potential on the belt means 324 opposite to the potential being imposed on the electrode means 318, the electrostatic device 327 having a rotatable electrode 328 disposed in engagement with the belt 324 and being interconnected to the electrostatic device 327 by a lead means 329.

Further, it may be found that by having an opposite potential imposed on the belt means 324 from the potential being imposed on the electrode 318, such potential will be imposed on the liquid in the slurry sheet 306 coming into contact therewith so that the upper liquid area of the slurry sheet 306 will have an opposite potential to the potential of the electrode means 18 and therefore be more readily drawn toward the electrode means 318 than would be the case if such upper liquid did not have the opposite potential imposed thereon. In this manner, a thicker sheet means 306 could be made by the apparatus 300 and the electrode means 318 could remove the liquid therefrom solely by the potential differential previously described.

Of course, the belt means 324 could also be utilized in combination with the apparatus 200 previously described and if such belt means were utilized therewith and it is not desired that the belt means 324 be drawn into squeezing action with the sheet 206 by the suction means being created by the suction boxes 210, such belt means 324 could be formed of foraminous material so that the same would not impede the flow of air through the sheet means 206 into the suction box means 210.

In forming other types of paper or articles, it may be found that it is desirable not to utilize the belt means 324 of the apparatus 300 and to provide a means for fluffing the paper sheet slurry as the same is being dried by the electrostatic principle of this invention.

Accordingly, another embodiment of this invention is generally indicated by the reference numeral 400 in FIG. 9 and parts thereof similar to the apparatus 200 previously described are indicated by like reference numerals raised in value by 200.

As illustrated in FIG. 11, the papermaking apparatus 400 is substantially identical to the apparatus 300 of FIG. 8 wherein the electrode means 418 are being utilized without the suction box means 210 in removing the moisture from the sheet means 406 as the same moves over the electrode means 418 on the moving belt means 401.

However, another foraminous belt means 430 is passed around a pair of roller means 431 and has its lower run moving from left to right in unison with the belt means 401 so that the paper sheet means 406 will be carried therebetween. A plurality of suction box means 406 will be carried therebetween. A plurality of suction box means 410, formed in a manner similar to the suction box means 210 previously described, are disposed against the upper side of the lower run of the belt means 430 to impose a suction on the other side of the sheet means 406 whereby the suction device 413, through the conduit means 414, will not only tend to draw the moisture or liquid in the sheet means 406 upwardly into the chambers 411 and, thus, into the inlet side 412 of the suction device 413, but will also tend to maintain or fluff the sheet means 406 to a predetermined thickness while the electrode means 418 is removing the liquid from the sheet means 406 in a downward direction through the moving belt means 401 in the manner previously described.

Thus, by using the suction box means 410 in combination with the electrode means 418, the liquid in the sheet means 406 at the top thereof will be readily removed by the suction box means 410 whereas the other liquid in sheet means 406 will be drawn downwardly by the aforementioned potential differential arrangement and the sheet means 406 will have a tendency to be fluffed or maintained in a predetermined thickness during the drying operation whereby a more fluffy tissue or the like can be provided by the apparatus 400 of this invention.

Of course, it is to be understood that the apparatus 400 can be utilized for making other than fluffy tissue as the principle being disclosed by the embodiment of FIG. 9 could apply to other types of paper or articles as desired.

In addition, the suction box means 410 of the apparatus 400 could include electrode means therein similar to the electrode means 218 previously described and have imposed thereon a potential opposite to the potential being imposed on electrode means 418 to further assist the suction box means 410 in drawing the upper part of the liquid in the sheet means 405 upwardly therefrom through the foraminous belt means 430 into the suction box means 410, if desired. In addition, the foraminous belt means 430 could have such opposite potential imposed thereon in a manner similar to the electrode means 422 for imposing a potential on the moving belt means 401.

Therefore, it can be seen that this continuation-in-part application provides an improved papermaking apparatus as well as an improved papermaking method.

While the various embodiments of this invention have been previously described in connection with laundry apparatus, papermaking apparatus, etc., wherein the attracting electrode is adapted to have the moisture being attracted thereby actually reach such electrode, it may be found that it is desirable to prevent the moisture from reaching the electrode to, in effect, short or ground the same or otherwise change the effective potential condition thereof.

Further, it may be found that it is desirable to surround such electrode means with an atmosphere condition or pressure different from the atmosphere condition or pressure normally disposed about the moisture bearing material being acted on by such electrode means.

Reference is now made to FIG. 12 wherein another papermaking apparatus of this invention is generally indicated by the reference numeral 700 and will now be described.

The papermaking apparatus 700 includes a continuously moving foraminous belt means 701 adapted to pass around the roller means 702 in the manner similar to the foraminous belt means 201 previously described for the embodiment of the papermaking apparatus of FIG. 9. The belt means 701 is adapted to have a paper slurry 703 disposed thereon in any of the manners previously described to the left in FIG. 12 so that the slurry 703 is moved from left to the right in FIG. 14 as the belt means 701 is moved from left to right in FIG. 12.

The papermaking apparatus 700 includes a nozzle means 704 which contains a rotatable and insulated electrode means 705 having the metallic electrode plate 706 thereof completely insulated by the electrically insulating material 707 that has vanes 708 at the outer periphery thereof and a stem portion 709 rotatably mounted in suitable bearing means 710. A conductor 711 in the stem 709 is electrically interconnected to the metal plate 706 and to the stationary contact means or slipring arrangement 712 which is interconnected by a lead 713 to the electrical potential creating device 714 that maintains electrical contact with the internal conductor 711 and the electrode plate 706. An air pump 715 is interconnected by a conduit means 716 to the interior chamber 717 of the nozzle means 704, the conduit means 716 having a suitable pressure regulator means 718 therein.

The nozzle 704 has an opening 719 at the upper side thereof and an opening 720 at the lower end thereof which can be a restricting opening 720 so as to maintain an air pressure in the chamber 717 greater than the atmospheric pressure surrounding the paper slurry 703 for the reasons previously set forth.

Of course, the nozzle means 704, pump 715, conduit 716, and pressure regulator 718 can be constructed to create a subatmospheric pressure about the rotatable electrode means 705, if desired.

In any event, it can readily be seen in FIG. 12 that as the paper slurry 703 is moved from left to right by the moving foraminous belt 701, the slurry 703 passes over the opening 719 in the nozzle means 704 and has the moisture therein attracted by the potential differential between the electrode plate 706 and the moisture in the slurry 703 so as to enter the nozzle means 704 and be attracted toward the electrode plate 706. However, since the moisture cannot reach the electrode plate 706, the potential condition of the electrode means 705 remains unchanged and the moisture collecting on the electrode means 705 can be removed therefrom by the centrifugal force of the rotating electrode 705 so as to pass out through the opening 720.

Another nozzle means 704A is provided for the papermaking apparatus 700 and parts thereof similar to the nozzle means 704 are indicated by like reference numerals followed by the reference letter "A."

As illustrated in FIG. 12, the air pump 715A is interconnected by the conduit 716A to the opening 720A at the bottom of the nozzle means 704A and is adapted to tend to evacuate the chamber 717A so as to maintain the same at a reduced atmospheric pressure relative to the atmospheric pressure surrounding the paper slurry 703 passing over the same.

The outlet side of the pumping means 715A for the airflow is interconnected to a conduit means 721 that leads to a chamber-defining means 722 having a rotatable and insulated electrode means 723 disposed therein for stripping moisture from the air passing through the chamber-defining means 722 that leads to a conduit means 724. The electrostatic creating device 714A is adapted to impose one potential on the metal plate 725 of the electrode means 723 by a lead 726 and an equal and opposite potential on the electrode plate 706A of the rotatable electrode means 705A of the nozzle means 704A by the lead 713A.

The conduit 724 has a pressure regulator 727 disposed therein and leads to a chamber-defining device 728 that carries a spray nozzle 729 for disposing or spraying a coating means 730 onto the top surface of the paper slurry 703 as the same passes over the nozzle means 704A. In particular, the chamber-defining means 728 has an opening 731 at the lower end thereof and through which the spraY nozzle means 729 is adapted to spray the coating 730 onto the top of the paper 703.

If desired, an electrical potential can be created on the coating material 730 as the same is sprayed from the nozzle 729 in a conventional manner by an electrostatic creating device 732 being electrically interconnected to the nozzle means 729 by a lead 733.

The operation of the papermaking apparatus 700 will now be described.

As the paper slurry 703 is moved from left to right in FIG. 12 past the nozzle means 704, the same removes moisture from the paper slurries 703 by the potential differential created between the electrode plate 706 and the moisture in the paper slurry 703 in the manner previously described.

However, as the paper slurry 703 passes under the chamber-defining means 728, the nozzle means 729 sprays the coating 730 onto the top of the paper slurry 703 with such coating 730 being attracted toward the nozzle means 704A by the aforementioned potential differential being created between the electrode plate 706A and the liquefied coating 730. In this manner, the coating 730 is not only confined to the paper slurry 703 but is fully impregnated thereto by the attracting force of the nozzle means 704A.

In particular, since the air pump 715A is tending to maintain the chamber 717A at a subatmospheric pressure below the atmospheric pressure surrounding the slurry 703 as the same passes over the nozzle means 704A, the air is expelled through the pump 715A into the chamber-defining means 722 to have any moisture thereof stripped by the rotating electrode means 723 in the manner similar to the electrode means 705 previously described.

The dried air is now forced through the pressure regulator 727 into the chamber-defining means 728 to surround the nozzle means 729 with a dried atmospheric pressure greater than the atmospheric pressure outside of the confining means 728 so that no adverse high-humidity condition will prevent the coating material 730 in the nozzle means 729 from receiving a charge from the charging device 732 so that the same will be fully directed toward the paper slurry 703 and when the same engages the paper means 703, such coating is attracted toward the electrode 705A which can have a potential thereon opposite to the potential initially being imposed on the coating 730 by the electrostatic device 732.

Accordingly, it can be seen that not only does the nozzle means 704A provide a function of removing moisture from the paper slurry 703 if the same still has a moisture content therein, but also the nozzle means 704A assures that the coating 730 is directed toward the paper 703 and will tend to hold and impregnate the same into the paper slurry 703 because of the aforementioned potential differential between the coating 730 and the electrode plate 706A of the nozzle means 704A.

Another electrode means for use with the papermaking apparatus either for moisture-removing purposes or for impregnating a coating therein is generally indicated by the reference numeral 750 in FIGS. 14 and 15 and comprises an insulated and rotatable cylindrical electrode means 751 and nozzle means 752, somewhat similar to nozzle means 704 of FIG. 12.

Alternately, instead of the electrode means 751 engaging against the foraminous belt 753 as illustrated in FIGS. 14 and 15, the electrode means 751A can be slightly spaced therefrom by disc means 754 at each end of the shaft means 760A, FIG. 14A, and functioning as illustrated in FIG. 14 so as to hold the cylindrical electrode means 751A in spaced relation from the foraminous belt 753A.

The nozzle means 752, FIGS. 14 and 15, rotatably carries a cylindrical electrode means 757 of this invention, the electrode means 757 comprising an electrically insulating material 758 having a cylindrical metallic electrode 759 completely embedded therein in the manner illustrated in FIGS. 14 and 15 so that the insulating material 758 will completely prevent any moisture from actually contacting the metallic electrode 759.

As illustrated in FIGS. 14 and 15, the insulated cylindrical electrode 757 has insulating shaft portions 760 extending from opposed sides thereof and respectively received in suitable bearing openings 761 of the nozzle means 752 whereby a suitable stationary electrical connector or slip ring 762 can be electrically connected to the metallic electrode 759 by a central conductor 759' in the shaft portion 760 even though the electrode means 757 rotates relative to the connector 762. This is accomplished in a manner similar to the stem 709, conductor 711 and stationary contact means or slip ring arrangement 712 of FIG. 12. The connector 762 is interconnected by a lead 763 to an electrical potential creating device 764 whereby the potential creating device 764 can create an electrical potential on the electrode means 759 for the moisture-removing purposes as previously described in connection with FIG. 12.

The nozzle means 752 has an opening 765 at the upper end thereof and out through which the cylindrical electrode means 757 extends in the manner illustrated in FIGS. 14 and 15 whereby a suitable compression spring 776 can be utilized to continuously urge the cylindrical electrode 757 into engaging contact with the foraminous belt 753.

A conduit means 767 leads to the interior 768 of the nozzle means 752 and has a restriction means 769 therein.

A suitable flexible doctor blade 770, or the like, is carried by the nozzle means 752 so as to be in engaging contact with the exterior surface of the cylindrical electrode means 757 to remove the moisture therefrom.

The operation of the nozzle means 752 of FIGS. 14 and 15 will now be described.

During the moisture removal operation, the electrical potential creating device 764 is creating a potential on the metallic electrode 759 of the electrode means 757 and since the electrode means 757 is in contact with the foraminous belt 753, motion of the foraminous belt 753 rightward in FIG. 14 causes the electrode means 757 to rotate in a clockwise direction in unison with belt 753 whereby the electrode 759, through the potential differential between the electrode 759 and the moisture-bearing material 780 causes the moisture in the material 780 to pass through the foraminous belt 753 and onto the outer peripheral surface 758 of the electrode means 757 to be subsequently wiped away by the doctor blade 770 and collect at the bottom of the nozzle means 751. Because the air pump 771 is interconnected to the interior 768 of the nozzle means 752 by a conduit means 772 and is creating an air pressure surrounding the moisture-bearing material 780, such air pressure in the nozzle means 752 will force the moisture collecting therein out through the conduit means 767.

Therefore, it can be seen that the cylindrical electrode means 757 is adapted to continuously remove moisture from the moisture-bearing material 780 by the aforementioned electrostatic principles.

However, it may be found that it is not desirable to have the exterior peripheral surface of the cylindrical electrode means 757 actually engage the foraminous belt 753 and that the same should be slightly space therefrom.

Accordingly, another apparatus of this invention is generally indicated by the reference numeral 750A in FIG. 14A and parts thereof similar to the apparatus 750 are sometimes indicated by like reference numerals followed by the reference letter "A."

As illustrated in FIG. 14A, the apparatus 750A is identical to the apparatus 750 previously described concerning FIGS. 14 and 15, except that a pair of large cylindrical discs 754 are carried by the shaft portion 760A of the cylindrical electrode means 757A outside of the nozzle means 752A and with those discs 734 bearing against the foraminous belt 753A so as to hold the cylindrical electrode means 757A slightly spaced from the foraminous belt 753A and thus causing rotation of electrode means 757A as the belt 756 moves rightward.

Thus, the cylindrical electrode means 757A is disposed spaced from the foraminous belt 753A, and electrostatically attracts moisture from the wet paper material 780A.

Accordingly, it can be seen that while the electrostatic features disclosed in some of the Figures of this application tend to direct moisture from moisture-bearing material toward an electrode means by a potential differential being created therebetween, the embodiments of FIGS. 12–15 provide electrode means that prevent the moisture from actually engaging the effective part of the electrode means to change the potential condition thereof and also such embodiments provide means for creating localized atmospheres about the electrode means different from the atmospheres about the moisture bearing material.

In this manner, it is believed than any humidity conditions which normally surround the moisture-bearing material will not cause a shorting or dissipation of the electrode potential differential feature of this invention.

Of course, instead of creating a different atmospheric condition about the electrode means by the nozzle means of this invention, such electrode can be surrounded by a dry gaseous media, such as an inert gas which would prevent any moisture saturation thereof.

While the various embodiments of this invention previously described provide a nonuniform electric field between the smaller collecting electrode means and the other larger electrode having an opposite potential whereby the higher intensity portion of the static electric field is adjacent the collecting electrode to cause the moisture to move toward the same, such static or alternating electric field means is more fully disclosed in FIGS. 16–19 hereinafter to be described.

For example, it is obvious from the embodiment of FIG. 5 of said U.S. Pat. No. 3,405,452, that the very small electrode means 112 of said patent in relation to the size of the charged supporting means 17A of FIG. 3 will create a nonuniform static electric field wherein the field lines converge on the collecting electrode means 112 so that the moisture in the laundry on the support means 17A will be drawn toward the higher intensity portion of the electric field adjacent the electrode 112.

Figure 16:
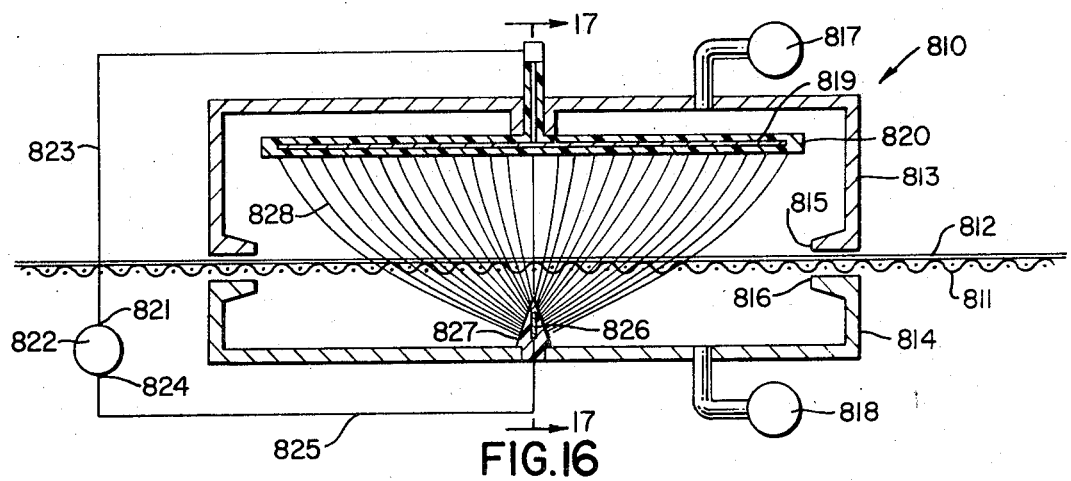
FIG. 16 is a view similar to FIG. 12 and illustrates another embodiment of this invention.
Figure 17:
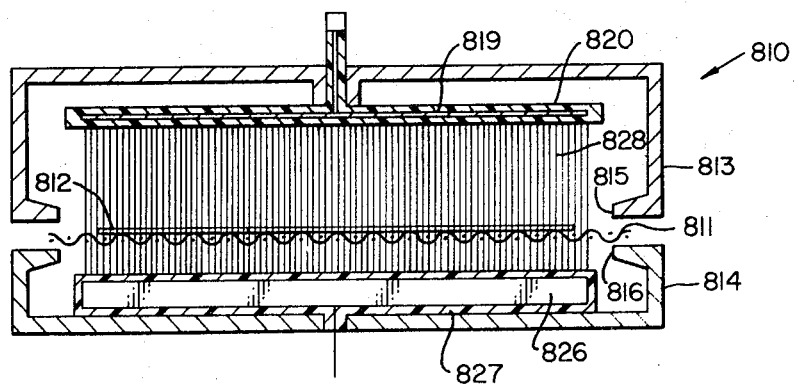
FIG. 17 is a cross-sectional view taken substantially on line 17—17 of FIG. 18.

Therefore, reference is now made to FIG. 16 of this application wherein another embodiment of this invention is generally indicated by the reference numeral 810 and comprises a papermaking apparatus or the like having a continuous foraminous support means 811 moving from left to right in FIG. 16 and carrying moisture-bearing paper means 812 on the upper side thereof that is to have the moisture thereof removed, the support means 811 and paper means 812 moving in unison between two nozzle means 813 and 814 of this invention respectively having open ends 815 and 816 facing toward each other and each being slightly pressurized by dry air being pumped therein by pump means 817 and 818 so as to tend to purge the nozzle means 813 and 814 from humid atmospheric conditions. The nozzle means 813 carries a large plate electrode means 819 covered with suitable insulating material 820 and being interconnected to one side of an electrical potential creating device 822 by lead means 823, the other side 824 of the electrical potential creating device 822 being interconnected by a lead means 825 to a small electrode means 826 covered by suitably insulating material 827 and being carried by the lower nozzle means 814.

By varying the size of the electrode means 819 and 826 relative to each other as well as directing a pointed or knife edge of the electrode means 826 toward the large plate electrode means 819 as well as by controlling the configuration of the insulating means 820 and 827 and the distance between the electrode means 819 and 826, a strong nonuniform electric field can be created between the electrode means 826 and 819 wherein the lines of force defining the nonuniform field have the higher intensity thereof adjacent the electrode means 826 as illustrated schematically by the field force lines 828 in FIG. 16.

In this manner, as the moisture-bearing paper material 812 passes between the nozzle means 813 and 814, the moisture therein is attracted by the nonuniform field in such a manner that the moisture tends to move through the foraminous belt means 811 toward the higher intensity portion of electric field 828 and, thus, toward the electrode means 826 for the reasons previously set forth.

While the electrostatic or electrical potential creating device 822 has been described as providing one potential on the electrode means 819 and another potential on the electrode means 826, it is to be understood that the device 822 can create opposite potentials on the electrode means 819 and 826 in an alternating manner whereby alternating current can be utilized rather than direct current as previously described.

Figure 18:
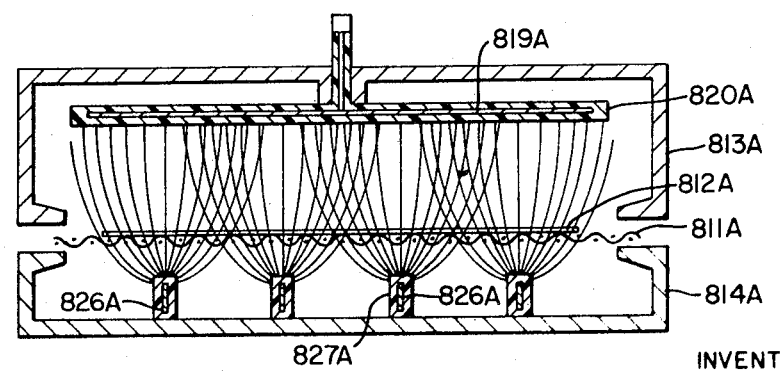
FIG. 18 is a view similar to FIG. 17 and illustrates another embodiment of this invention.

Also, while the electrode means 826 is illustrated in FIG. 16 as being knifelike with the longitudinal axis thereof extending transverse to the direction of movement of the support means 811, it is to be understood that the electrode means 826 could comprise a plurality of individual wires or points 826A as illustrated in FIG. 18 and could be arranged in any suitable pattern relative to the upper electrode means 819A so as to be generally disposed completely under the area bounded by the upper electrode means 819A if desired. Also, the knifelike electrode means 826 of FIGS. 16 and 17 can be disposed with the longitudinal axis thereof extending in the direction of movement of the support means 811 and a plurality of the same can be utilized in a transverse or longitudinal pattern or other as desired, the purpose being to create one or more nonuniform fields between the upper and lower electrode means with the higher intensity portion of the electrostatic or alternating electric field therebetween being adjacent the lower electrode means so as to cause the moisture in the moisture-bearing material to pass through the support means and move toward the higher intensity portion of the electric field adjacent the lower electrode means. Of course, the closer the support means 811 and paper 812 are to the lower electrode means 826, the greater is the force of the nonuniform field thereon for moisture removal purposes.

While the various apparatus of this invention have been previously described in utilizing the electrostatic feature of this invention for removing the moisture from the moisture-bearing material through the supporting means carrying the moisture-bearing material toward an electrode means disposed spaced from the supporting means, it is to be understood that the electrostatic principles of this invention can be utilized to remove the moisture from the moisture-bearing material without causing the moisture to actually leave and pass through the supporting means.

Figure 19:
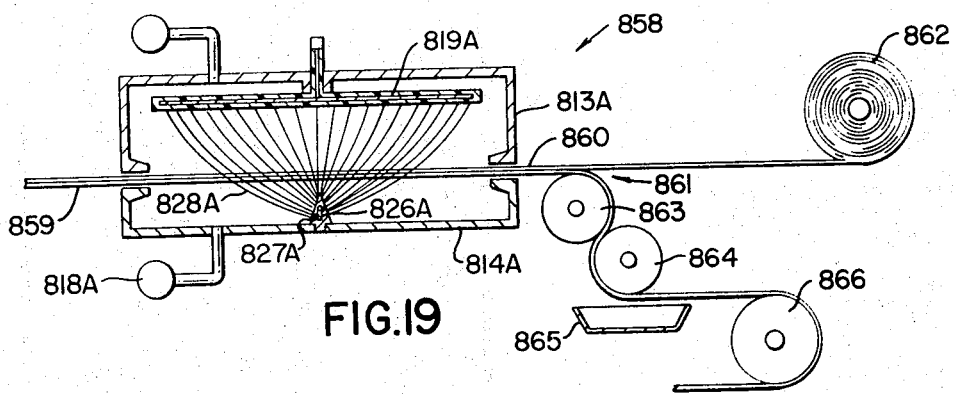
FIG. 19 is a view similar to FIG. 16 and illustrates another embodiment of this invention.

For example, reference is now made to FIG. 19 wherein another papermaking apparatus of this invention is generally indicated by the reference numeral 858 and includes upper and lower nozzle means 813A and 814A formed in the same manner as the nozzle means 813 and 814 of FIG. 16 previously described wherein the electrode means 826A and 819A create a nonuniform field 828A therebetween.

The continuously moving support means 859 passes between the nozzle means 813A and 814A and carries the moisture-bearing paper material 860 therewith toward the right, the supporting means 859 comprising moisture-absorbing material, such as felt or the like, on the upper side thereof and a moisture-impervious lower surface formed from plastic or the like for a purpose now to be described.

As the moisture-bearing material 860 and support means 859 pass through the electrostatic field 828A, the higher intensity portion of the electrostatic field 828A causes the moisture in the moisture-bearing material 860 to be driven into the moisture-absorbing upper side of the support means 859 while the moisture-impervious lower side thereof prevents the moisture from entering into the lower nozzle means 814A. In this manner, the moisture is removed from the moisture-bearing material 860 but is received in and retained in the supporting means 859 which is separated from the dried paper in the region of the reference numeral 861 whereby the dried paper 860 is drawn onto the supply roll means 862 and the support means 859 passes between a pair of squeezing rollers 863 and 864 to remove the collected moisture therefrom and be carried away by a trough means 865 or other suitable means before the support means 859 is directed back to the left by a roller means 866 to pick up more wet paper slurry 860 to be passed between the nozzle means 813A and 814A.

Of course, the support means 859 need not have a moisture-impervious material on the lower side thereof as the electrostatic field 828A could be so constructed and arranged that the same will merely cause the moisture in the moisture-bearing material 860 to enter the moisture-absorbing material 859 and be held thereby before passing out of the supporting means 859 toward the lower electrode means 826A, as the particular portion of the absorbing support means 859 has passed out of the field 828A.

Also, the moisture-absorbing material 859 could be so constructed and arranged that the same does permit the moisture collected therein to pass toward the electrode means 826A in the manner previously described to be removed from the nozzle means 814A in the manner previously described.

However, it is to be understood that if the moisture in the moisture-bearing material is drawn into the supporting means and prevented from leaving the supporting means so as to contaminate the lower electrode means, the lower electrode means 826A of FIG. 19 can be surrounded by a dry atmosphere by the pressure means 818A and never have the effective potential thereof changed by the moisture in the moisture-bearing material 860.

Similarly, a laundry apparatus of this invention is generally indicated by the reference numeral 867 in FIG. 20 and has features to be used in the papermaking embodiments of this invention. Such apparatus 867 comprises a rotatable foraminous drum 868 mounted in a water-retaining drum or casing 869 having a lower cavity 870 receiving a rotatable and cylindrical moisture-collecting means 871 of this invention adapted to be rotated in unison with the drum 868 through either cooperating gear means or by friction as desired. However, as illustrated in FIG. 22, the collecting drum means 871 has pinion gear means 872 on the outer ends thereof disposed in meshing relation with pinion gear means 873 on the outer ends of the rotatable drum 868 so as the drum means 862 is driven in one direction in a conventional manner, the rotation of the drum means 868 causes rotation of the collecting means 871 about stationary shaft means 874 carried by the outer tub 869 and being secured to a support means 875 inside the collector drum 871. The support means 875 therefore remains stationary as the outer portion 876 of the collector means 871 is rotated, the support means 875 carrying a plurality of knifelike or pointed electrode means 877 suitably insulated by insulating material 878 or noninsulated as desired as no moisture can reach the electrode means 877.

In particular, the outer portion 876 of the collector means 871 can be formed of insulating material and can have a plurality of pockets 879 formed on the outer surfaces thereof adapted to receive moisture therein as illustrated by the reference numeral 880 in FIG. 21.

By creating one electrical potential on the electrode means 877 and an opposite potential on the inner drum 868 in the manner previously described or on the other internal electrode means mounted within the rotatable drum 868, nonuniform fields 881 are provided as illustrated in FIG. 21 which tend to cause the moisture in the moisture-bearing laundry 882 to pass through the perforated drum 868 into the pockets 879 as illustrated in FIG. 21 and be carried by the pockets 880 from above the electrode means 877 down below the same and out of the force of attraction of the fields of the electrode means 877 whereby the moisture 880 is dumped from the pockets 879 a into the chamber 870 to be drained therefrom by conventional draining means 883.

Therefore, it can be seen that the laundry apparatus 867 of FIGS. 20–22 causes the moisture in the moisture-bearing material to be drawn therefrom and be collected in he collecting means 871 in such a manner that the collecting means 871 carries the collected moisture away from the electric field means created by the electrode means 877 into a position over the drain 883 so that the moisture 880 can drop out of the pockets 879 to be carried away at the drain 883. Such features of FIGS. 20–22 can be applied to the papermaking embodiments of this invention.

For example, the various belts, etc., disclosed in connection with the papermaking apparatus may have pinion gear means or teeth along the edges of the belts similar to gear means 873 of FIG. 22 to cause rotation of the rotary means 168 of FIG. 3, 130, 144, FIG. 6, 186 in FIG. 7, and elsewhere, as is obvious.

In FIG. 20, a pump 884, with or without a regulator corresponding to 718 in FIG. 12, may be connected to compartment 870 to provide a slightly pressurized super atmosphere or pressure differential in such compartment 870 because of the air restriction by the clothes 882 and the perforate drum 868 and the flexible vanes 885. The separated water flows out through drain 883.

If desired, the supporting means in the various embodiments of this invention can be formed of conductive material or nonconductive material and if conductive, can be grounded, charged or insulated from ground depending on the desired results of the field force characteristics produced thereby.

Thus, it can be seen that the various principles of this invention can be utilized to dry moisture-bearing material, whether the same be paper, pellets, etc., by causing the moisture thereof to pass through the supporting means toward an electrode means or pass into a supporting means to be carried away by the supporting means as desired.

While the forms of the invention now preferred have been disclosed as required by the statutes, other forms may be used, all coming within the scope of the claims which follow.

What is claimed is:

1. A dried sheet-making apparatus comprising a moist sheet web forming first section having mechanical means to remove moisture from slurry to form said slurry into a self-adhering moist sheet web, a moist sheet web drying second section having electrostatic means that creates an electrostatic field action on at least some of said moisture in said moist sheet web that removes at least some of said moisture from said moist sheet web in substantially liquid form solely by said electrostatic field action to form said moist sheet web into a sheet having less of the original moisture thereof, and means to transfer said self-adhering moist sheet web from said first section into said second section.

2. An apparatus according to claim 1 in which said mechanical means of said first section includes belt means.

3. An apparatus according to claim 1 in which said electrostatic means includes belt means.

4. An apparatus according to claim 1 in which said mechanical means includes belt means and in which said electrostatic means includes separate belt means.

5. An apparatus according to claim 1 in which said electrostatic means includes electrode means to produce a nonuniform electrostatic field on opposite sides of said moist web.

6. An apparatus according to claim 5 in which said electrostatic means includes a rotary drying roll contacted by said moist web.

7. An apparatus according to claim 6 in which a moisture absorbent belt holds said moist web against said roll.

8. An apparatus according to claim 7 with relatively small electrode means adjacent said absorbent belt.

9. An apparatus according to claim 8 with relatively large electrode means inside said rotary drying roll.

10. An apparatus according to claim 6 in which a plurality of rotary drying rolls are contacted by said moist web.

11. An apparatus according to claim 10 in which moisture absorbent belt means holds said moist web against said drying rolls.

12. An apparatus according to claim 11 in which said rolls are located zigzag in parallel rows.

13. An apparatus according to claim 5 in which said electrostatic means includes an absorbent belt having a flat run which supports said moist web.

14. An apparatus according to claim 13 in which relatively small electrode means is located adjacent one side of said flat run.

15. An apparatus according to claim 14 in which moisture removal is provided for said absorbent belt.

16. An apparatus according to claim 1 in which said electrostatic means includes absorbent belt means, and in which moisture removal means is provided for said absorbent belt means.

17. An apparatus according to claim 16 in which said moisture removal means for said absorbent belt means includes electrostatic means.

18. An apparatus according to claim 17 in which said last named electrostatic means includes means for applying a nonuniform field to said absorbent belt means.

19. An apparatus according to claim 17 in which said last-named electrostatic means includes rotary moisture collecting means.

20. An apparatus according to claim 19 in which said rotary moisture-collecting means has inverting means to empty moisture out of said collecting means.

21. An apparatus according to claim 20 in which said moisture-collecting means has inverting means to empty moisture out of said collecting means.

22. An apparatus according to claim 21 in which said inverting means includes a rotary drum having moisture-collecting pockets which are upwardly directed to receive moisture from said absorbent means and which are inverted to empty moisture out of said pockets.

23. An apparatus according to claim 19 in which relatively small electrode means is provided inside said rotary moisture collecting means.

24. An apparatus according to claim 23 in which relatively large electrode means is provided outside said rotary moisture-collecting means.

25. An apparatus according to claim 1 in which said first section has mechanical means to form paper-foming slurry into a moist paper sheet web, and said second section has said electrostatic means to form said moist paper sheet web into a substantially drier paper sheet.

26. A method for making dried sheet means comprising the steps of forming a self-adhering moist sheet web from a slurry in a web forming first section having mechanical means to remove moisture from said slurry to form said slurry into said moist sheet web, transferring said self-adhering moist sheet web from said first section to a web drying second section, and creating an electrostatic field action on at least some of said moisture in said moist sheet web that removes at least some of said moisture from said moist sheet web in substantially liquid form solely by said electrostatic field action to form a sheet having less of the original moisture thereof by electrostatic means in said second section.

* * * * *

Dedication

3,633,282.—*Robert R. Candor*, Miami Township and *James T. Candor*, Washington Township, Ohio. LIQUID-REMOVING APPARATUS AND METHOD. Patent dated Jan. 11, 1972. Dedication filed Oct. 17, 1980, by the inventor.

Hereby dedicates to the Public the entire term of said patent.

[*Official Gazette January 6, 1981.*]